(12) United States Patent
Bonte et al.

(10) Patent No.: US 12,024,309 B2
(45) Date of Patent: Jul. 2, 2024

(54) FUEL TANK DIFFUSER

(71) Applicant: Airbus Operations Limited, Bristol (GB)

(72) Inventors: Eric Bonte, Bristol (GB); David Petit, Bristol (GB); Daniel Peachey, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 304 days.

(21) Appl. No.: 17/482,189

(22) Filed: Sep. 22, 2021

(65) Prior Publication Data

US 2022/0153427 A1 May 19, 2022

(30) Foreign Application Priority Data

Nov. 19, 2020 (GB) ..................................... 2018164

(51) Int. Cl.
*B64D 37/16* (2006.01)
(52) U.S. Cl.
CPC .................................... *B64D 37/16* (2013.01)
(58) Field of Classification Search
CPC ........ B64D 37/02; B64D 37/04; B64D 37/08; B64D 37/16
USPC ....................................................... 141/350
See application file for complete search history.

(56) References Cited

U.S. PATENT DOCUMENTS

| 3,590,886 | A | * | 7/1971 | Judd | ........................ | G05D 7/03 |
| | | | | | | 137/630.15 |
| 3,662,793 | A | * | 5/1972 | Calisher | ................ | F16L 37/127 |
| | | | | | | 137/461 |
| 3,674,061 | A | * | 7/1972 | Calisher | .................. | F16L 37/34 |
| | | | | | | 248/908 |
| 3,866,638 | A | * | 2/1975 | Mingus | .................... | F16L 37/35 |
| | | | | | | 277/618 |
| 6,440,317 | B1 | | 8/2002 | Koethe | | |
| 7,258,130 | B2 | * | 8/2007 | Cortez | ................ | G01F 23/0053 |
| | | | | | | 137/393 |
| 2019/0107089 | A1 | * | 4/2019 | Bykowski | ............ | B01D 35/005 |

FOREIGN PATENT DOCUMENTS

CN 208559018 3/2019
WO 2009/068065 6/2009

OTHER PUBLICATIONS

Combined Search and Examination Report for GB Application No. 2018164.0 dated Aug. 9, 2021, 11 pages.

* cited by examiner

*Primary Examiner* — Timothy L Maust
(74) *Attorney, Agent, or Firm* — Nixon & Vanderhye P.C.

(57) ABSTRACT

A fuel system for an aircraft including a fuel tank for storing fuel during operation of the aircraft and a diffuser disposed inside the fuel tank. The diffuser is configured such that it forms part of a flow path configured to connect a fuel source to the inside of the fuel tank. The diffuser includes a wall which at least partially defines an internal space of the diffuser; an opening in the wall, which provides access to the internal space; and a blocking component configured to block the opening.

21 Claims, 5 Drawing Sheets

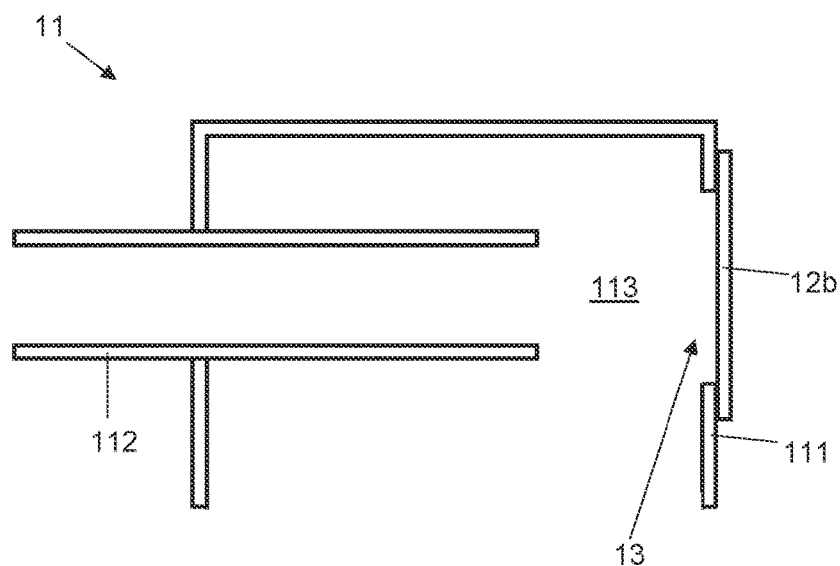
Fig. 1c
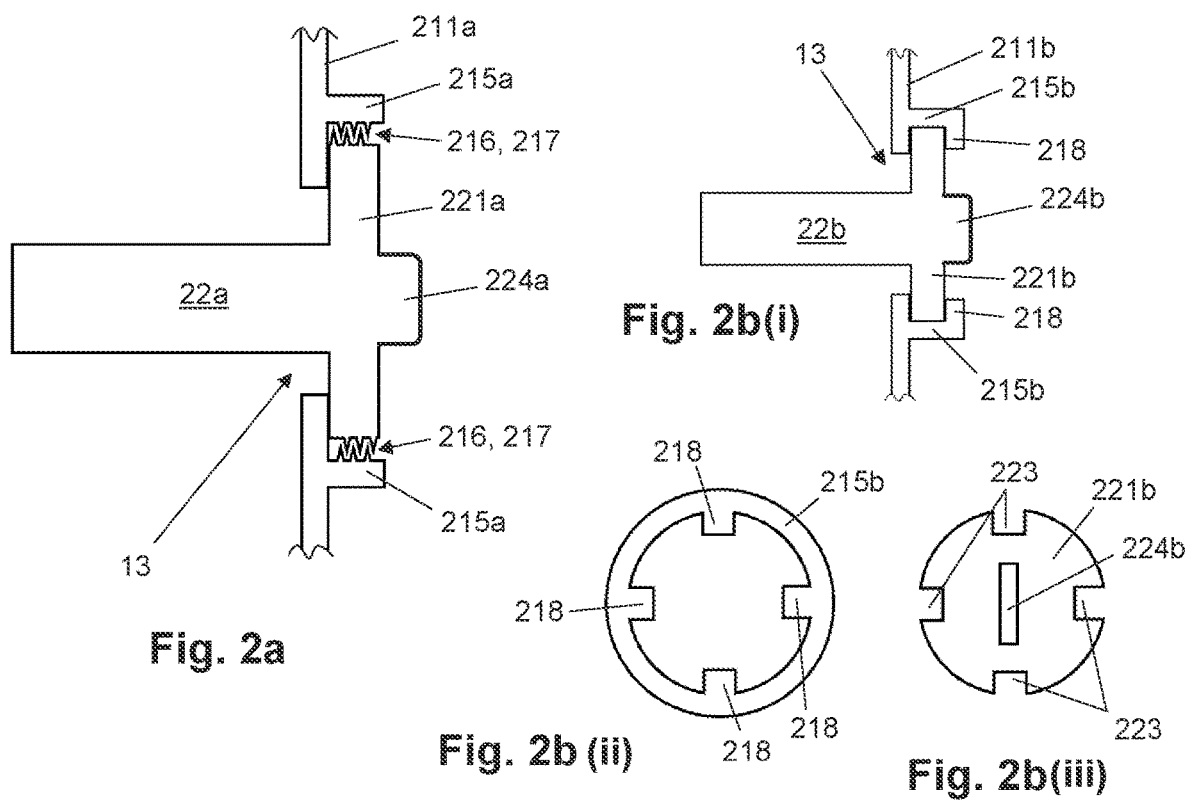
Fig. 2a
Fig. 2b(i)
Fig. 2b(ii)
Fig. 2b(iii)

FUEL TANK DIFFUSER

RELATED APPLICATION

This application claims priority to and incorporates by reference United Kingdom patent application GB 2018164.0, filed Nov. 19, 2020.

TECHNICAL FIELD

The present invention relates to a fuel system for an aircraft, a kit of parts for forming a fuel system, an aircraft comprising a fuel system, and a method for use in manufacturing an aircraft.

BACKGROUND

Fuel storage tanks typically have a diffuser fitted to the inlet through which fuel is delivered into the tank. The function of the diffuser is to reduce the speed of the fuel entering the fuel tank during filling of the fuel tank, which in turn reduces static build up, reduces the creation of fuel vapour, and also reduces foaming effects. The flammability of the fuel tank is thereby lower than it would be if the diffuser was not present.

For aircraft applications it is desirable to pressure test fuel delivery pipework which connects a fuel source to the inlet, after it has been fully assembled and connected to the inlet. The presence of the diffuser over the inlet creates difficulties in accessing the inlet in order to block it off to enable such pressure testing. Conventionally, to test the pipework immediately upstream of the fuel tank inlet the diffuser must be removed and then refitted after the testing, which adds significant time to the assembly process.

SUMMARY

A first aspect of the present invention provides a fuel system for an aircraft. The fuel system comprises a fuel tank for storing fuel during operation of the aircraft and a diffuser disposed inside the fuel tank. The diffuser is configured such that it forms part of a flow path configured to connect a fuel source to the inside of the fuel tank. The diffuser comprises a wall which at least partially defines an internal space of the diffuser; an opening in the wall, which provides access to the internal space; and a blocking component configured to block the opening.

Optionally, the blocking component is removably engaged with the wall.

Optionally, the fuel system further comprises a locking member configured to engage with the blocking component and the wall to prevent disengagement of the blocking component and the wall.

Optionally, the blocking component and the wall each comprise mutually interlocking features configured to be interlockable to retain the blocking component on the wall.

Optionally, the fuel system further comprises a seal element between the blocking component and the wall, the seal element being configured to prevent fuel flowing through the opening.

Optionally, the opening is configured to be engageable with at least two different types of blocking component.

Optionally, the fuel system further comprises a fuel delivery apparatus which forms a further part of the flow path. A first end of the fuel delivery apparatus is connectable to the fuel source and a second end of the fuel delivery apparatus is connected to the diffuser.

Optionally, the fuel tank is formed by structural components of an aircraft.

Optionally, the fuel tank is formed by a wing box of an aircraft.

Optionally, the blocking component is a test blocking component, and is configured to block the flow path so as to prevent fuel flowing into the fuel tank.

Optionally, the diffuser comprises an outlet through which fuel flows into the internal space of the diffuser during a process of delivering fuel into the fuel tank, and the test blocking component comprises a seal member configured to block the outlet.

Optionally, the seal member is configured to create a pressure-tight seal against the outlet.

Optionally, the test blocking component comprises a port configured to be engageable with a pressure test device such that the pressure test device is able to measure the pressure in the flow path upstream of the test blocking component when engaged with the port.

Optionally, the blocking component is an operational blocking component, and is configured to permit fuel from the fuel source to flow into the fuel tank through the diffuser when the operational blocking component is engaged with the opening.

A second aspect of the invention provides a kit of parts. The kit of parts comprises a fuel tank, a diffuser, a test blocking component, and an operational blocking component. The fuel tank has an inlet through which fuel can flow into the fuel tank. The diffuser is disposed inside the fuel tank, is connected to the inlet, and comprises a wall which defines an opening and which is configured to be engageable with a blocking component. The test blocking component configured to engage with the wall to block the opening, and to prevent fuel from a fuel source connected to the inlet from flowing into the fuel tank when the test blocking component is engaged with the wall. The operational blocking component configured to engage with the wall to block the opening, and to permit fuel from a fuel source connected to the inlet to flow into the fuel tank when the operational blocking component is engaged with the opening.

Optionally, the kit of parts further comprises a locking component configured to engage with the operational blocking component and the wall when the operational blocking component is engaged with the wall, such that disengagement of the operational blocking component and the wall is prevented.

Optionally, the kit of parts is configured to form a fuel system according to the first aspect when assembled.

A third aspect of the invention provides an aircraft comprising a fuel system according to the first aspect when the blocking component is an operational blocking component.

A fourth aspect of the invention provides a method for use in manufacturing an aircraft. The method comprises: (i) providing a fuel tank component configured to form at least part of an aircraft fuel tank connected to a fuel delivery apparatus, the fuel delivery apparatus being configured to define a flow path between a fuel source and the inside of the fuel tank and comprising a diffuser configured to be disposed within the fuel tank, (ii) arranging a test blocking component on the diffuser such that the test blocking component blocks the flow path and prevents fluid flow between an internal space of the fuel delivery apparatus and the inside of the fuel tank; (iii) performing a pressure test of the fuel delivery apparatus; and (iv) replacing the test blocking component with an operational blocking component which permits fluid flow between the internal space of the fuel delivery apparatus and the inside of the fuel tank.

Optionally, the method further comprises, after replacing the test blocking component with the operational blocking component; assembling the fuel tank component into a fuel tank.

BRIEF DESCRIPTION OF THE DRAWINGS

Embodiments of the invention will now be described, by way of example only, with reference to the accompanying drawings, in which:

FIG. 1c is a schematic cross-section through the diffuser of the example fuel system of FIG. 1a, including an exemplary operational blocking component;

FIG. 2a is a schematic cross-section of an exemplary test blocking component engaged with a wall of a diffuser;

FIGS. 2b(i), 2b(ii) and 2b(iii) show multiple schematic views of an alternative exemplary test blocking component;

DETAILED DESCRIPTION

Each example fuel system described herein is suitable for use on an aircraft, and comprises a fuel tank for storing fuel during operation of the aircraft and a diffuser. The diffuser is disposed inside the fuel tank and is configured such that the diffuser forms part of a flow path configured to connect a fuel source to the inside of the fuel tank. The diffuser comprises a wall which at least partially defines an internal space of the diffuser; an opening in the wall which provides access to the internal space; and a blocking component configured to block the opening.

The opening in the wall of the diffuser advantageously enables access to an inlet of the fuel tank whilst the diffuser is fitted. This allows the inlet to be blocked, so that pipework upstream of the inlet can be pressure tested, without needing to remove the diffuser. The blocking component is configured to be simple and quick to install over the opening, such that a process of installing the blocking component on the diffuser is significantly faster than removing and reinstalling the diffuser. Assembly time for an aircraft having a fuel system according to the invention is therefore reduced.

Figure 1A:
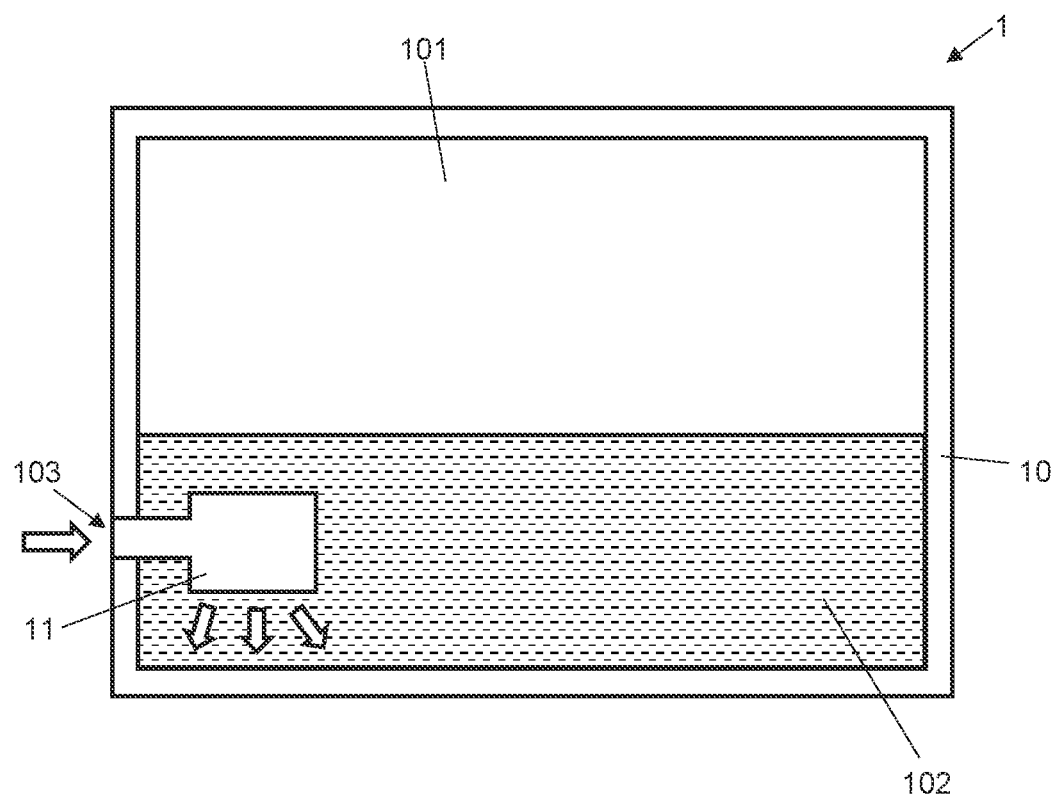
FIG. 1a is a cross-section through an example fuel system.

FIG. 1a shows an example fuel system 1 according to the invention. The fuel system 1 is for use on an aircraft. The fuel system 1 comprises a fuel tank 10 for storing fuel during operation of an aircraft on which the fuel system 1 is installed. The fuel tank 10 is configured to store a liquid fuel, and is shown partially filled with liquid fuel 102. The ullage space 101 of the fuel tank 10 is filled with a gas (such as air or an inert gas). The fuel tank 10 may be formed by structural components of an aircraft. In such examples one or more walls of the fuel tank 10 may be formed by a wing rib, a wing skin panel, a spar, or any other structural component of a wing. In some examples the fuel tank 10 is formed by a wing box of an aircraft. The fuel tank comprises a fuel inlet 16 and one or more outlets 14 through which fuel is delivered to engines of the aircraft.

Figure 1B:
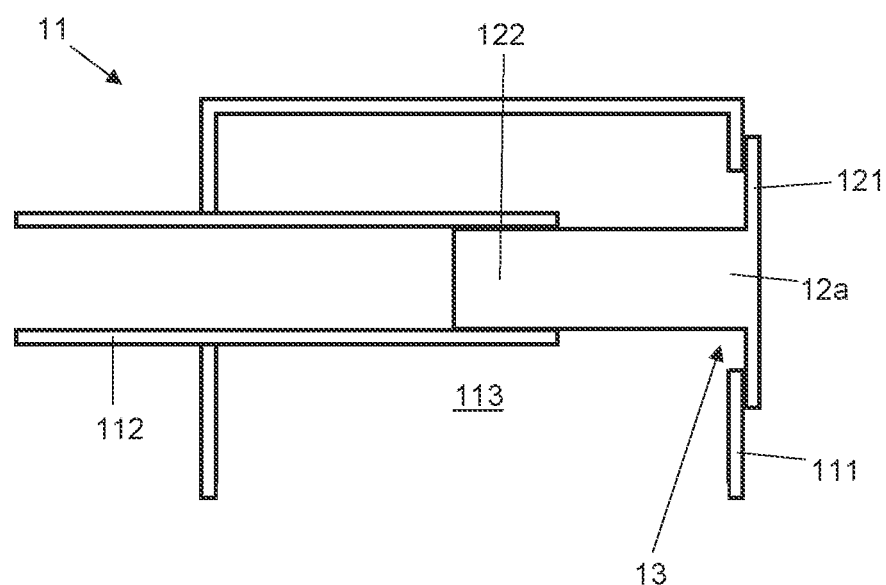
FIG. 1b is a schematic cross-section through a diffuser of the example fuel system of FIG. 1a, including an exemplary test blocking component.

The fuel system 1 further comprises a diffuser 11 disposed inside the fuel tank 10. The diffuser 11 is configured and located such that the diffuser forms part of a flow path configured to connect a fuel source to the inside of the fuel tank 10. The diffuser 11 is located near the bottom of the fuel tank 10. The direction of flow of fuel into the fuel tank 10 through the diffuser 11 is indicated by the block arrows. In particular, the diffuser 11 is disposed on (or in) an inlet 103 of the fuel tank 10. In some examples, the diffuser 11 is connected to (that is, it is in fluid communication with) a fuel delivery pipeline (not shown) which extends between the inlet 103 and a fuel source (or a port to which a fuel source is connectable). FIGS. 1b and 1c show the diffuser 11 in more detail, in isolation from the fuel tank 10.

FIGS. 1b and 1c are cross-sections through the diffuser 11. FIG. 1b shows the diffuser 11 in a test configuration suitable for pressure testing refuelling pipework connected to the fuel system 1. FIG. 1c shows the diffuser 11 in an operational configuration, suitable for operation of an aircraft on which the fuel system 1 is installed. The illustrated diffuser 11 comprises a cuboidal body member formed by five walls, which together define an internal space 113 of the body member. The lower side (with respect to the orientation showing in FIGS. 1a-c) of the body member is open. A pipe 112, which is configured to sealingly connect to fuel delivery pipework, extends through one wall of the body member into the internal space 113 of the body member. The end of the pipe 112 which is disposed of within the internal space 113 is open, to allow fuel to enter the internal space 113 of the diffuser 11 through the pipe 112. The open end of the pipe 112 is therefore an outlet through which fuel flows into the internal space 113 of the diffuser 11 during a process of delivering fuel into the fuel tank 10.

An opening 13 is provided in a wall 111 of the body member. The wall 111 is opposite the wall through which the pipe 112 extends. The opening 13 is substantially aligned with the pipe 112 along the axis 15 of the pipe. The opening 13 provides access to the internal space 113. The location of the opening 13 is such that the opening 13 provides access to the open end of the pipe 112. In the illustrated example the opening 13 is substantially coaxial with the pipe 112. The opening 13 is at least as large as an internal diameter of the pipe 112 and may be significantly larger (as is the case in the illustrated example). The opening 13 may be (but need not be) circular. The opening 13 is configured to be engageable with at least two different types of blocking component, each of which is configured to block the opening 13.

The diffuser 11 further comprises a blocking component 12a, 12b configured to block the opening 13. The blocking component may be either a test blocking component 12a or an operational blocking component 12b, as will be explained below with reference to FIGS. 1b and 1c. The blocking component 12a, 12b is removably engaged with the wall 111 of the diffuser 11. In some examples the blocking component 12a, 12b is removably engaged with the pipe 112. In some examples the blocking component 12a, 12b and the wall 111 each comprise mutually interlocking features configured to be interlockable to retain the blocking component 12a, 12b on the wall 111. In some examples the engagement mechanism is configured such that the blocking component 12a, 12b can be engaged with the wall 111 and disengaged from the wall 111 manually by an operator without the use of any tools.

FIGS. 2a and 2b show two alternative engagement mechanisms by which a blocking component can be removably engaged with a wall of a diffuser according to the invention. The illustrated diffuser walls 211a, 211b each have the same general features as the diffuser wall 111 described above. The illustrated blocking components 22a, 22b are test blocking components which each have substantially the same features as the example test blocking component 12a. However; the engagement mechanisms illustrated by FIGS. 2a and 2b may equally be applied to an operational blocking component such as the example operational blocking component 12b.

The example engagement mechanism shown in FIG. 2a is based on a screw thread. In this example the diffuser wall 211a comprises a cylindrical rim 215a which extends perpendicularly from the outer face of the wall 211a. The rim 215a encircles the opening 13, and in this example is coaxial with the opening 13. The diameter of the rim 215a is greater than the diameter of the opening 13. A screw thread 216 is provided on the inner surface of the rim 215a. A corresponding screw thread 217 is provided on an outer circumferential surface of a plate part 221a of the blocking component 22a. The plate part 221a is configured such that the outer circumferential surface on which the screw thread 217 is provided is disposed adjacent the inner surface of the rim 215a when the blocking component 22a is engaged with the wall 211a.

The blocking component 22a may therefore be engaged with the wall 211a by arranging the blocking component 22a to be coaxial with the rim 215a such that the screw threads 216, 217 are in contact, and then rotating the blocking component 22a relative to the wall 211a in a direction such that the interaction of the screw threads 216, 217 drives the blocking component 22a towards the wall 211a. The rotation may be continued until the blocking component 22a is in contact with the wall 211a. A "handle" feature 224a protrudes from the outer surface of the plate part 221a to facilitate rotation of the blocking component 22a by an operator. The handle feature 224a may be configured to be easily graspable by a hand, such that the use of a tool is not required to engage the blocking component 22a with the wall 211a.

The example engagement mechanism shown in FIG. 2b(i), (ii) and (iii) is a bayonet-style engagement mechanism. FIG. 2b(i) is a cross-sectional view through the blocking component 22b and the wall 211b in an engaged arrangement. FIG. 2b (ii) is a view of the rim 215b along an axial direction of the rim. FIG. 2b (iii) is a view of the outer surface of a plate part 221b of the blocking component 22b, along an axial direction of the blocking component 22b. In this example the diffuser wall 211b comprises a cylindrical rim 215b which extends perpendicularly from the outer face of the wall 211a. The rim 215b has substantially the same features as the rim 215a of the FIG. 2a example, except that instead of a screw thread it comprises four radially-extending tabs 218 that protrude inwardly from a distal end of the rim 215b. In the illustrated example the tabs 218 are equally distributed around the rim 215b, with an angular separation of 90° between adjacent tabs, although this may be different in other examples.

A plate part 221b of the blocking component 22b comprises four recesses 223, the configurations and locations of which correspond to the configurations and locations of the tabs 218. When the blocking component 22b and the rim 215b are coaxial and relatively oriented such that the tabs 218 and recesses 223 are aligned (as is the case in parts (ii) and (iii) of FIG. 2b), the plate part 221b of the blocking component 22b may be received within the recess defined by the rim 215 such that the plate part 221b is in contact with the outer surface of the wall 211b.

The blocking component 22b may therefore be engaged with the wall 211b by arranging the blocking component 22b to be coaxial with the rim 215b, at a rotational position relative to the rim 215b such that the recesses 223 are aligned with the tabs 215. The blocking component 22b is then moved axially toward the wall 211b until the plate part 221b contacts the outer surface of the wall 211b. The blocking component 22b is then rotated by between 5° and 85° relative to the wall 211b, such that the recesses 223 are no longer aligned with the tabs 218. This is the state shown in part (i) of FIG. 2b. It can be seen from part (i) of FIG. 2b that, in this non-aligned state, the tabs 218 act to prevent the blocking component 22b from moving axially away from the wall 211b. The blocking component 22b comprises a handle feature 224b having substantially the same features as the handle feature 224a, to facilitate rotation of the blocking component 22a by an operator.

Returning to FIG. 1, in some examples the fuel system 1 comprises a locking member which is configured to engage with the blocking component 12a, 12b and with the wall 111 in order to prevent disengagement of the blocking component 12a, 12b from the wall 111. In some examples the fuel system 1 comprises multiple such locking members. The locking member may take any suitable form known in the art.

Figure 3:
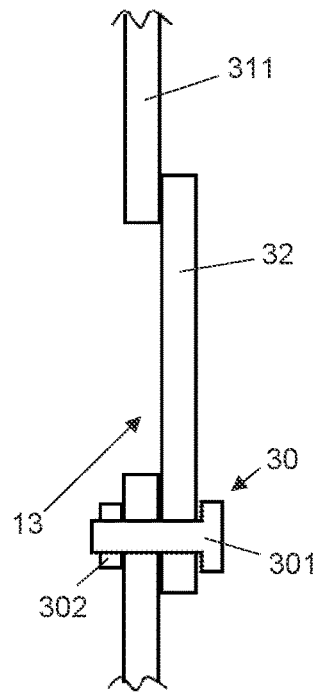
FIG. 3 is a schematic cross-section of an exemplary operational blocking component engaged with a wall of a diffuser.

FIG. 3 shows a particular example locking member 30 suitable for use with the fuel system 1, retaining a blocking component 32 on a wall 311 of a diffuser. The illustrated diffuser wall 311 has the same general features as the diffuser wall 111 described above. The illustrated blocking component 32 is an operational blocking component which has substantially the same features as the example operational blocking component 12b. However; the locking member 30 may equally be applied to a test blocking component such as the example test blocking component 12a.

The illustrated example locking member 30 comprises a bolt 301 engaged with a nut 302. The stem of the bolt 301 extends through the blocking component 32 and the wall 311. The nut 302 is retained on the inner surface of the wall 311 by any suitable mechanism. In other examples the hole in the wall through which the stem of the bolt 301 extends is threaded, in which case the nut 302 is omitted. The locking member 30 may be installed such that the blocking component 32 is clamped against the wall 311. The locking member 30 functions to prevent movement of the blocking component 32 relative to the wall 311. In some examples more than one such locking member 30 may be engaged with the blocking component 32 and the wall 311. This may facilitate preventing the blocking component 32 from rotating relative to the wall 311.

Returning to FIG. 1, in FIG. 1b a first type of blocking component 12a is disposed on the wall 111 of the diffuser 11 and is blocking the opening 13. The first type of blocking component 12a is a test blocking component which is configured to block the flow path of fuel into the fuel tank 10. The test blocking component 12a thereby prevents fuel from flowing into the fuel tank 10 when it is installed on the diffuser 11. In the illustrated example the test blocking component 12a achieves blocking the flow path by having a seal member 122 which is configured to block an outlet of the diffuser 11 (which in the illustrated example is the open end of the pipe 112).

As well as the seal member 122, the test blocking component 12a also comprises a plate member 121 which is configured to block the opening 13. The seal member 122 and the plate member 121 are integrally formed. The plate member 121 is configured to be disposed on an outer surface of the wall 111 and to completely cover the opening 13. The outer surface of the plate member 121 may comprise one or more features (not shown) configured to enable the test blocking component 12a to be easily grasped and manipulated by an operator.

The plate member 121 is configured to removably engage with the wall 111 to retain the test blocking component in a desired position relative to the wall 111. For example, the engagement between the plate member 121 and the wall 111 may be configured to resist axial movement of the test blocking component 12a relative to the wall 111 even in the face of a force acting to drive the test blocking component 12a away from the wall 111. Such an engagement thereby ensures that the test blocking component 12a blocks the outlet of the pipe 112 even when the inside of the pipe is pressurised to a high pressure, as occurs during pressure testing of fuel delivery pipework connected to the diffuser 11. The engagement mechanism may take any suitable form, such as mutually interlocking features and/or one or more locking components, as described above.

The seal member 122 extends from an inner surface of the plate member 121 (that is, a surface which faces towards the internal space 113 of the diffuser 11). The seal member 122 is configured to create a pressure-tight seal with the open end of the pipe 112. The seal member 122 is generally cylindrical, and has an outer diameter equal to the inner diameter of the outlet of the pipe 112. The seal member 122 is coaxial with the pipe 112 when the test blocking component 12a is installed on the diffuser 11. The axial length of the seal member 122 is greater than the distance (along the axial direction of the pipe 112) between the outlet of the pipe 112 and the wall 111. This means that the distal end of the seal member 122 extends into the pipe 112. In some examples the seal member 122 is sized such that it is an interference fit in the pipe 112.

In other examples the seal member 122 may have a different configuration to that shown in FIG. 1b. Indeed, any configuration which enables a pressure-tight seal between the seal member 122 and the open end of the pipe 112 to be achieved may be used. In one such alternative example the distal end of the seal member 122 comprises an axially extending cylindrical recess, the inner diameter of which is equal to the outer diameter of the open end of the pipe 112. In that example the open end of the pipe 112 is received within the recess, and an outer surface of the pipe 112 is in close contact with an inner surface of the recess to create a seal.

In some examples an additional sealing component is provided between the seal member and the pipe to facilitate the achievement of a pressure-tight seal between the seal member 122 and the pipe when the test blocking component 12a is installed on the diffuser 11. In examples where the seal member has the configuration shown in FIG. 1b, such an additional sealing component is provided between the outer surface of the seal member and the inner surface of the pipe 112. The additional sealing component may be retained on the seal member, by any suitable mechanism. The additional sealing component may take any suitable form known in the art, such as a ring of impermeable resilient material.

Figure 4:
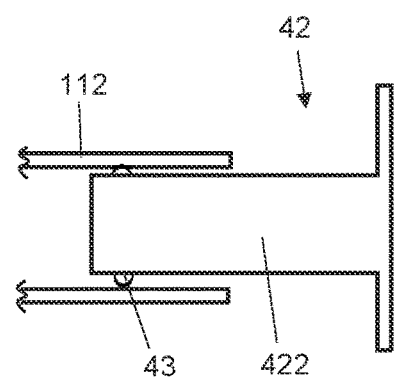
FIG. 4 is a schematic cross-section of an exemplary test blocking component blocking an outlet of a diffuser.

An example test blocking component 42 comprising an additional sealing component 43 is shown in FIG. 4. Apart from the additional sealing component 43 the test blocking component 42 is substantially identical to the test blocking component 12a of FIG. 1b. The test blocking component 42 is shown in an operational state in which it is blocking the open end of the pipe 112 of the diffuser 11. The rest of the diffuser 11 is omitted from FIG. 4. In this example the additional sealing component 43 is a resilient ring member which is bonded to the outer surface of a distal end of a seal member 422 of the test blocking component 42. The resilient ring member 43 may be formed from any suitable material such as rubber or an elastomer. In some examples at least the outer surface of the resilient ring member 43 may be formed from a low-friction material to facilitate insertion of the seal member 422 into the open end of the pipe 112.

Returning to FIG. 1b, in some examples the test blocking component 12a comprises a port configured to be engageable with a pressure test device such that the pressure test device is able to measure the pressure in the flow path upstream of the test blocking component 12a when engaged with the port.

Figure 6I:
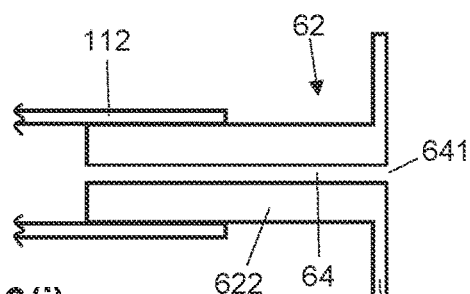
FIGS. 6(i) and 6(ii) show multiple schematic views of an exemplary test blocking component.
Figure 6:
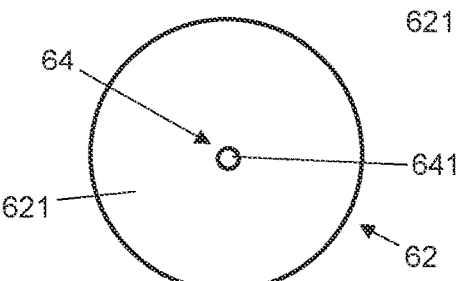

FIGS. 6(i) and 6(ii) show an example test blocking component 62 which comprises a pressure test port 64. FIG. 6(i) is an axial view which shows an outer face of a plate member 621 of the test blocking component 62. FIG. 6(ii) is a cross-sectional view through the test blocking component 64 engaged with the diffuser pipe 112 (the rest of the diffuser is omitted for clarity). Apart from the pressure test port 64, the example test blocking component 62 is substantially identical to the example test blocking component 12a of FIG. 1b. The pressure test port 64 comprises a bore which extends axially through the test blocking component 62 from the outer surface of the plate member 621 to the distal end of the blocking member 622. The opening 641 of the bore where it meets the outer surface of the plate member 621 is configured to be engageable with a pressure test device (not shown) that is configured to measure a pressure within a sealed volume. In particular, the pressure test device is configured to measure the pressure within fuel delivery pipework upstream of and including the diffuser pipe 112.

The pressure test port 64 is engageable with the pressure test device such that a pressure tight seal is formed between the port 64 and the pressure test device when the pressure test device is engaged with the port 64. Such engagement may be achieved by means of cooperating features provided on the port opening 641 and the pressure test device, such as corresponding screw threads. In some examples the port opening 641 may comprise a seal element of any suitable type to facilitate the achievement of a pressure tight seal between the port 64 and the pressure test device.

Returning to FIG. 1, in FIG. 1c a second type of blocking component 12b is disposed on the wall 111 of the diffuser 11 and is blocking the opening 13. The second type of blocking component 12b is an operational blocking component which is configured to permit fuel from a fuel source connected to the inlet of the fuel tank 10 to flow into the fuel tank 10 when the operational blocking component 12b is installed on the diffuser 11. The operational blocking component 12b achieves this by blocking the opening 13 without blocking the open end of the pipe 112.

The operational blocking component 12b is in the form of a plate or cover, which is configured to block the opening 13. The operational blocking component 12b is configured to be disposed on an outer surface of the wall 111 and to completely cover the opening 13. The outer surface of the operational blocking component 12b may comprise one or more features (not shown) configured to enable the operational blocking component 12b to be grasped and manipulated by an operator. The operational blocking component 12b is removably engaged with the wall 111. The engagement mechanism may take any suitable form, such as mutually interlocking features and/or one or more locking components, as described above.

The operational blocking component 12b may have substantially the same configuration as the plate member 121 of the test blocking component 12a. This enables the same engagement mechanism to be used to retain the operational blocking component 12b on the wall 111 as is used to retain the test blocking component 12a on the wall 111. The operational blocking component 12b and the test blocking component 12a may thereby be readily interchangeable on the diffuser 11.

In some examples a seal element is disposed between the operational blocking component 12b and the outer surface of the wall 111. The seal element is configured to prevent fuel from flowing through the opening 13. The seal element may be attached by any suitable mechanism to the outer surface of the wall 111 or to the inner surface of the operational blocking component 12b. The seal element may be a face seal. The seal element may take any suitable form known in the art, such as a ring of impermeable resilient material.

Figure 5:
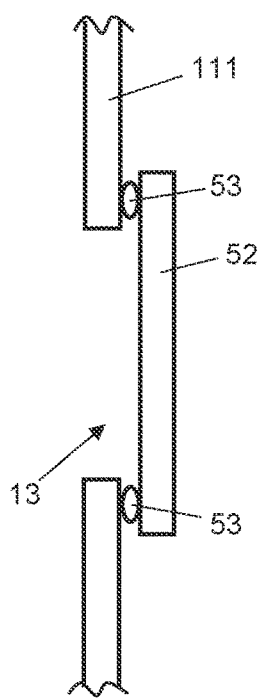
FIG. 5 is a schematic cross-section of an exemplary operational blocking component engaged with a wall of a diffuser.

An example operational blocking component 52 comprising a seal element 53 is shown in FIG. 5. Apart from the seal element, the operational blocking component 52 is substantially identical to the operational blocking component 12b of FIG. 1c. The operational blocking component 42 is shown in an operational state in which it is blocking the opening 13 in the wall 111 of the diffuser 11. The rest of the diffuser 11 is omitted from FIG. 5. In this example the seal element 53 is a resilient ring member which is bonded to the inner surface of the operational blocking component 52. The resilient ring member 53 may be formed from any suitable material such as rubber or an elastomer.

Figure 7:
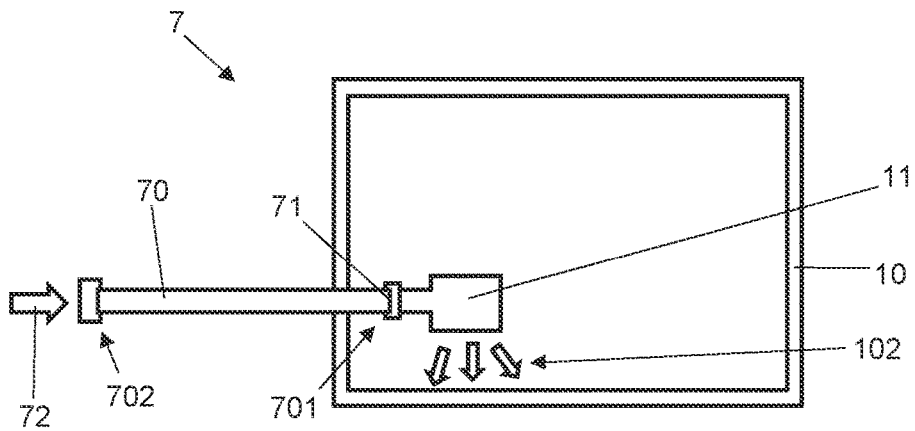
FIG. 7 is a schematic cross-section of another exemplary fuel system.

In some examples the fuel system 1 of FIG. 1a comprises a fuel delivery apparatus which forms a further part of the flow path that is configured to connect a fuel source to the inside of the tank 10. FIG. 7 shows such an example fuel system 7. The fuel system 7 comprises the fuel tank 10 and diffuser 11, as well as a fuel delivery pipe 70. The fuel tank 10 is shown in an empty state in FIG. 7. Although the fuel delivery pipe 70 is shown as a single straight pipe section for ease of depiction, it may more usually comprise multiple pipe sections. The fuel delivery pipe 70 may comprise one or more joints, bends, intersections, or the like. The fuel delivery pipe 70 may comprise or be connected to one or more fuel delivery-related devices such as pumps, valves, filters or the like.

A first end 701 of the fuel delivery pipe 70 is sealingly connected to the pipe 112 of the diffuser by a connector 71. The connector 71 may be of any suitable design. Other examples are possible in which at least a part of the fuel delivery pipe 70 is formed integrally with the diffuser pipe 112. A second end 702 of the fuel delivery pipe 70 is connected or connectable to a fuel source 72 (represented by a block arrow in FIG. 7). For example, the second end 702 may be connectable to a refuelling port of the aircraft, or a further fuel tank of the aircraft. The second end 702 may comprise a connector suitable for forming the connection to the fuel source 72. Fuel 102 which has flowed along the fuel delivery pipe 70 from the fuel source 72 to the diffuser 11 is shown entering the fuel tank 10 in the form of block arrows.

Figure 8:
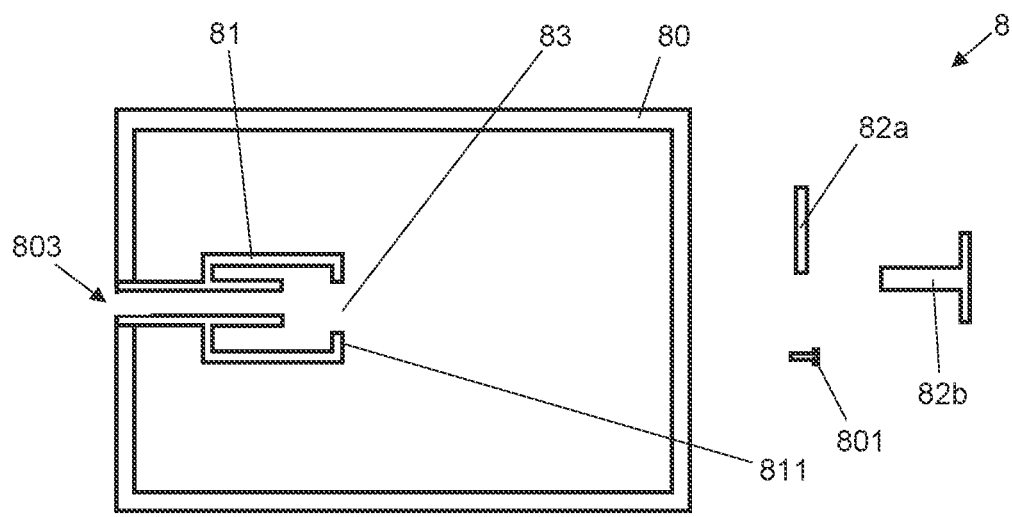
FIG. 8 is a schematic view of an exemplary kit of parts.

FIG. 8 shows a kit of parts 8 which is configured to form a fuel system according to the invention, such as the example fuel system 1 of FIG. 1a. The kit of parts 8 comprises a fuel tank 80; a diffuser 81; a test blocking component 82a; and an operational blocking component 82b. The test blocking component 82a and the operational blocking component 82b are interchangeably engageable with a wall 811 of the diffuser 81. FIG. 8 shows the fuel tank 80 and diffuser 81 in cross-section, where the plane of the cross-section is parallel to an open side of the diffuser 81. The fuel tank 81 has an inlet 803 through which fuel can flow into the fuel tank 81, and the diffuser 81 is disposed inside the fuel tank and connected to the inlet 803.

The diffuser 81 comprises a wall 811 which defines an opening 83 and which is configured to be engageable with the test blocking component 82a and also with the operational blocking component 82b. The test blocking component 82a is configured to engage with the wall 811 to block the opening 83 and is configured to prevent fuel from a fuel source connected to the inlet 803 from flowing into the fuel tank 80 when the test blocking component 82a is engaged with the wall 811. The operational blocking component 82b is configured to permit fuel from a fuel source connected to the inlet 803 to flow into the fuel tank 80 when the operational blocking component 82b is engaged with the opening 83. The components of the kit of parts 8 have the same features as the corresponding components of the fuel system 1 described above.

In some examples the kit of parts further comprises a locking component 801 configured to engage with the operational blocking component 82b and with the wall 811 when the operational blocking component 82b is engaged with the wall 811, such that disengagement of the operational blocking component 82b and the wall 811 is prevented by the locking component 801. The locking component may, in some examples, also be configured to engage with the test blocking component 82a and with the wall 811 when the test blocking component 82a is engaged with the wall 811, such that disengagement of the test blocking component 82a and the wall 811 is prevented by the locking component 801. The locking component 801 has the same features as the example locking component 301 of FIG. 3. In some examples the kit of parts may comprise multiple locking components 801.

Figure 9:
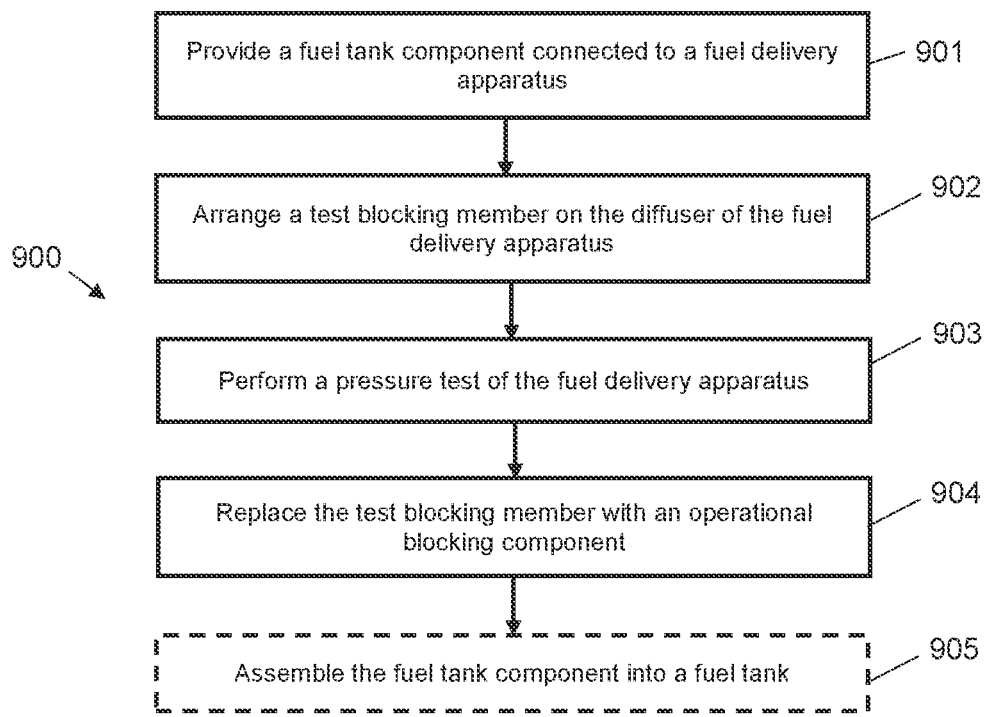
FIG. 9 is a flow chart illustrating an example method.

FIG. 9 is a flow chart which illustrates a method 900 for use in manufacturing an aircraft. Performing the method results in the creation of a fuel system according to the invention, such as either of the example fuel systems 1, 7 described above. In some examples the method may comprise assembling a kit of parts according to the invention, such as the example kit of parts 8 described above. The method may be performed as part of a process of testing a fuel system of the aircraft which is being manufactured.

A first block 901 of the method 900 comprises providing a fuel tank component configured to form at least part of an aircraft fuel tank. The fuel tank component may be suitable for forming at least part of a fuel tank having the features of the example fuel tank 10 or the example fuel tank 80 described above. The fuel tank component may comprise one or more structural components of the aircraft. In some examples, the fuel tank component comprises one or more structural wing components. In some examples the fuel tank component is provided already assembled into a fuel tank. In some such examples providing a fuel tank component may comprise providing an aircraft structure which forms a fuel tank, such as a wing box.

The fuel tank component is provided connected to a fuel delivery apparatus, which may have any of the features of the example fuel delivery apparatus of FIG. 7. The fuel delivery apparatus is configured to define a flow path between a fuel source and the inside of the fuel tank of which the fuel tank component forms (or is intended to form) at least a part. The fuel delivery apparatus comprises a diffuser, which is intended to be disposed within the fuel tank. The diffuser may have the same features as the example diffuser 11 described above. The fuel delivery apparatus may further include one or more pipes; valves; connectors; or the like. The fuel delivery apparatus may comprise all components which define a flow path for fuel between a fuel source (such as a refuelling port of the aircraft) and the inside of the fuel tank.

In some examples performing block 901 may comprise connecting the fuel delivery apparatus to the fuel tank component. Connecting the fuel delivery apparatus to the fuel tank comprises forming a fluid-tight seal (in any suitable manner) between the fuel delivery apparatus and the fuel tank component. At the time of connecting the fuel delivery apparatus to the fuel tank component, the fuel tank component may not yet be connected to other fuel tank components, such that the fuel tank is in a non-assembled or a partially assembled state. In other examples performing block 901 comprises providing a pre-assembled fuel system, for example as part of a substantially complete aircraft wing structure which is in a condition to be joined to a fuselage structure.

In a second block 902, a test blocking component is arranged on the diffuser such that the test blocking component blocks the flow path and prevents fluid flow between an internal space of the fuel delivery apparatus and the inside of the fuel tank of which the fuel tank component is to form a part. The test blocking component may have the same features as any of the example test blocking components 12a, 22a, 22b, 42, 62, 82b described above. The test blocking component is arranged on the diffuser in any manner suitable to the particular design of the test blocking component, such that the blocking function is achieved. For example arranging the test blocking component on the diffuser may comprise engaging the test blocking component with a wall of the diffuser, in any of the manners described above in relation to the example test blocking components 12a, 22a, 22b, 42, 62, 82a.

In a third block 903, a pressure test of the fuel delivery apparatus is performed. In examples in which the fuel tank component is provided not assembled into a fuel tank, the pressure test is performed before the fuel tank component has been assembled into a fuel tank. This may be advantageous for enabling easy access to the fuel tank and fuel delivery apparatus for the purposes of performing the test and/or fixing any issues identified by the test. Alternatively, in examples in which the fuel tank component is provided already assembled into a fuel tank, the pressure test is performed when the fuel tank is in an assembled state. It may be desirable to perform the pressure test after the fuel tank has been assembled in case any damage has occurred to the fuel delivery system during the process of assembling the fuel tank.

The pressure test may be performed by a pressure test device. Performing the pressure test may comprise engaging such a pressure test device with a port comprised in the test blocking apparatus, as described above in relation to FIG. 6. The pressure test may be performed in any suitable manner known in the art.

In block 904 the test blocking component is replaced with an operational blocking component which permits fluid flow between the internal space of the fuel delivery apparatus and the inside of the fuel tank. The operational blocking component may have the same features as any of the example operational blocking components 12b, 32, 52, 82b described above. Replacing the test blocking component with the operational blocking component comprises removing the test blocking component from the diffuser (for example by disengaging it from the wall of the diffuser in any suitable manner dependent on the nature of the engagement) and then arranging the operational blocking component on the diffuser.

The operational blocking component is arranged on the diffuser in any manner suitable to the particular design of the operational blocking component. For example arranging the operational blocking component on the diffuser may comprise engaging the operational blocking component with a wall of the diffuser, in any of the manners described above in relation to the example blocking components of FIGS. 1 to 5. The operational blocking component may be arranged on the diffuser sufficiently securely that it cannot become disengaged from the diffuser during normal operation of the aircraft.

Block 904 may be performed before the fuel tank component is assembled into a fuel tank. However; more typically it may be performed after the fuel tank component has been assembled into a fuel tank, since this enables pressure testing to be carried out at point during an aircraft assembly process when the risk of any damage being incurred by the fuel delivery apparatus is negligible. As mentioned above, the design of the diffuser and of the test and operational blocking components facilitates performing a pressure test in an assembled state of the fuel tank, since these items are configured such that the process of engaging and disengaging the test and operational blocking components with the diffuser is simple and easy to perform even with limited access.

In an optional fourth block 905 the fuel tank component is assembled into a fuel tank. Block 905 is only performed when the fuel tank component is provided in block 901 before it has been assembled into a fuel tank. Performing block 905 may comprise assembling an aircraft structure, such as a wing box, which forms all or part of the fuel tank. Upon completion of block 905 the fuel tank component may be comprised in a substantially fully assembled aircraft wing which is substantially ready to be joined to a fuselage of the aircraft.

Figure 10:
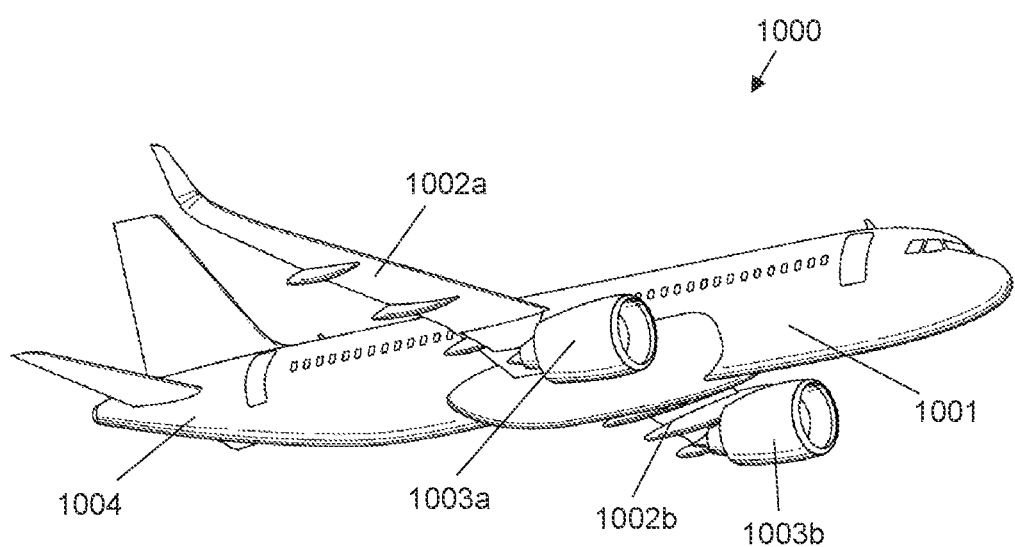
FIG. 10 is a perspective view of an exemplary aircraft.

FIG. 10 shows an example aircraft 1000 comprising a fuel system according to the invention (such as the example fuel system 1 or the example fuel system 7 described above). The aircraft 1000 comprises a fuselage 1001, a pair of wings 1002a and 1002b, a pair of engines 1003a and 1003b, and an empennage 1004.

The aircraft 1000 comprises a plurality of fuel tanks (not visible) and a fuel distribution system for transporting fuel from the tanks to the engines 1003a, 1003b. For example, the fuel tanks may comprise sealed compartments at least partly formed by the structure of the wings 1002a, 1002b, the empennage 1004, and/or the fuselage 1001, and/or any other part of the aircraft 1000. The aircraft 1000 further comprises a refuelling port (not visible) and fuel delivery apparatus (not visible) configured to provide a flow path for fuel between the refuelling port and one or more of the fuel tanks. An inlet of each fuel tank may be connected to the fuel delivery apparatus, and a diffuser within each fuel tank may be connected to the inlet of that fuel tank. At least some of the diffusers on the aircraft have the same general features as the example diffuser 11, and these diffusers in combination with the fuel tanks in which they are located form fuel systems according to the invention.

In particular, each fuel tank which is formed by the structure of one of the wings 1002*a*, 1002*b* comprises a diffuser having the same general features as the diffuser 11. Each wing 1002*a*, 1002*b* therefore comprises a fuel system according to the invention. Each wing tank fuel system according to the invention may have been manufactured according to the example method 1000 described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuel system for an aircraft comprising:
 a fuel tank for storing fuel during operation of the aircraft; and
 a diffuser disposed inside the fuel tank and forming part of a fuel flow path configured to connect a fuel source to an interior of the fuel tank;
 wherein the diffuser includes:
  a wall at least partially defining an internal space in the diffuser for the fuel;
  a fuel inlet configured to pass fuel from the fuel source into the internal space, wherein the fuel inlet includes a fuel conduit extending through the wall having an open end from which the fuel flows from the fuel inlet into the diffuser, wherein the open end of the fuel conduit is isolated from the wall;
  a fuel outlet in the wall configured to allow the fuel to flow from the diffuser into the interior of the fuel tank;
  an opening in the wall providing access to the internal space from the fuel tank, wherein the opening is spaced apart from the fuel inlet and the fuel outlet; and
  a blocking component configured to block the opening.

2. The fuel system according to claim 1, wherein the blocking component is removably engaged with the wall.

3. The fuel system according to claim 2, further comprising a locking member configured to engage with the blocking component and the wall to prevent disengagement of the blocking component and the wall.

4. The fuel system according to claim 1, wherein the blocking component and the wall each comprise mutually interlocking features configured to be interlockable to retain the blocking component on the wall.

5. The fuel system according to claim 1, further comprising a seal element between the blocking component and the wall, the seal element being configured to prevent fuel flowing through the opening.

6. The fuel system according to claim 1, wherein the blocking component includes a test blocking component and an operational blocking component,
 wherein the operational blocking component, while blocking the opening, prevents the fuel from flowing through the opening and into the interior of the fuel tank without obstructing the fuel inlet, and
 wherein the test blocking component, while blocking the opening, extends from the opening through a portion of the internal space and to the fuel inlet to prevent fuel flowing through the fuel inlet into the diffuser.

7. The fuel system according to claim 1, further comprising a fuel delivery apparatus forming a further part of the flow path, wherein a first end of the fuel delivery apparatus is connectable to the fuel source and a second end of the fuel delivery apparatus is connected to the fuel inlet.

8. The fuel system according to claim 1, wherein the fuel tank is formed by a structural component of an aircraft.

9. The fuel system according to claim 8, wherein the fuel tank is formed by a wing box of the aircraft.

10. The fuel system according to claim 1, wherein the blocking component is a test blocking component and is configured to block the flow path to prevent fuel flowing into the fuel tank.

11. The fuel system according to claim 10, wherein the test blocking component comprises a seal member configured to block the fuel outlet.

12. The fuel system according to claim 11, wherein the seal member is configured to create a pressure-tight seal against the outlet.

13. The fuel system according to claim 10, wherein the test blocking component comprises a port configured to be engageable with a pressure test device such that the pressure test device is able to measure the pressure in the flow path upstream of the test blocking component when engaged with the port.

14. The fuel system according to claim 1, wherein the open end of the fuel conduit is aligned with the fuel inlet along an axis of the fuel pipe.

15. A fuel system for an aircraft comprising:
 a fuel tank for storing fuel during operation of the aircraft; and
 a diffuser disposed inside the fuel tank and forming part of a flow path configured to connect a fuel source to an interior of the fuel tank;
 wherein the diffuser includes:
  a wall at least partially defining an internal space in the diffuser to receive fuel;
  a fuel conduit extending through the wall having a fuel conduit inlet configured to be in fluid communication with the fuel source and a fuel conduit outlet isolated from the wall, wherein the fuel conduit is configured to allow fuel from the fuel source to flow through the fuel conduit and from the fuel conduit outlet into the diffuser;
  a fuel outlet in the wall configured to allow the fuel to flow from the diffuser into the interior of the fuel tank;
  an opening in the wall providing access to the internal space from the fuel tank, wherein the opening is spaced apart from the fuel inlet and the fuel outlet; and
  a blocking component configured to block the opening, wherein the blocking component is an operational blocking component, and the operational blocking component is configured to permit fuel from the fuel source to flow into the fuel tank through the diffuser and out the fuel outlet when the operational blocking component is engaged with the opening.

16. An aircraft comprising the fuel system according to claim 15.

17. A kit of parts comprising:
a fuel tank having an inlet through which fuel can flow into the fuel tank;
a diffuser disposed inside the fuel tank, connected to the inlet; wherein the diffuser comprises a wall which defines an opening and which is configured to be engageable with a blocking component;
a test blocking component configured to engage with the wall to block the opening, wherein the test blocking component is configured to prevent fuel from a fuel source connected to the inlet from flowing into the fuel tank when the test blocking component is engaged with the wall; and
an operational blocking component configured to engage with the wall to block the opening, wherein the operational blocking component is configured to permit fuel from a fuel source connected to the inlet to flow into the fuel tank when the operational blocking component is engaged with the opening.

18. The kit of parts according to claim 17, further comprising a locking component configured to engage with the operational blocking component and the wall when the operational blocking component is engaged with the wall, such that disengagement of the operational blocking component and the wall is prevented.

19. The kit of parts according to claim 17, configured to form a fuel system in an aircraft.

20. A method for use in manufacturing an aircraft comprising:
providing a fuel tank component configured to form at least part of an aircraft fuel tank connected to a fuel delivery apparatus, the fuel delivery apparatus being configured to define a flow path between a fuel source and the inside of the fuel tank and comprising a diffuser configured to be disposed within the fuel tank, arranging a test blocking component on the diffuser such that the test blocking component blocks the flow path and prevents fluid flow between an internal space of the fuel delivery apparatus and the inside of the fuel tank;
performing a pressure test of the fuel delivery apparatus; and
replacing the test blocking component with an operational blocking component which permits fluid flow between the internal space of the fuel delivery apparatus and the inside of the fuel tank.

21. The method according to claim 20, further comprising, after replacing the test blocking component with the operational blocking component; assembling the fuel tank component into a fuel tank.

* * * * *